United States Patent [19]

Madsen

[11] 3,996,486
[45] Dec. 7, 1976

[54] SYNCHRONOUS MACHINE WITH A RATED POWER OF AT LEAST 1 MVA

[75] Inventor: Kristian Dahl Madsen, Vasteras, Sweden

[73] Assignee: Allmanna Svenska Elektriska Aktiebolaget, Vasteras, Sweden

[22] Filed: Sept. 4, 1975

[21] Appl. No.: 610,432

[30] Foreign Application Priority Data

Sept. 6, 1974 Sweden .......................... 7411270 7

[52] U.S. Cl. ............................... 310/211; 310/212; 310/262; 310/265
[51] Int. Cl.² ......................................... H02K 3/06
[58] Field of Search .......... 310/171, 211, 212, 262, 310/218, 265, 214

[56] References Cited
UNITED STATES PATENTS

| | | | |
|---|---|---|---|
| 2,370,458 | 2/1945 | Goran | 310/211 |
| 2,421,860 | 6/1947 | Winther | 310/211 |
| 2,462,451 | 2/1949 | Winther | 310/211 UX |
| 3,401,280 | 9/1968 | Lackey et al. | 310/211 X |

*Primary Examiner*—Mark O. Budd
*Attorney, Agent, or Firm*—Watson, Cole, Grindle & Watson

[57] ABSTRACT

An asynchronous machine with a rated power of at least 1 MVA has a laminated stator core which supports a multiphase AC winding and a rotor surrounded by the stator core and having a length substantially greater than the length of the laminated stator core. The rotor has winding slots running axially along its whole length, each of the slots having wall portions facing each other and converging radially outward in connection with a central plane. Winding bars are arranged in the winding slots and are included in a squirrel-cage winding and fit the slot walls. An annular winding portion at each end of the rotor short-circuits the rotor bars, such winding portion lying axially within the end surface of the rotor core and outside the end surface of the stator core. The bars may be U-shaped in cross-section, with one flange of each adjacent pairs of bars located in the same winding slot. The end portions of the rotor core have annular grooves therearound.

7 Claims, 6 Drawing Figures

SYNCHRONOUS MACHINE WITH A RATED POWER OF AT LEAST 1 MVA

BACKGROUND OF THE INVENTION

1. Field of the Invention

The present invention relates to an asynchronous machine having a rated power of at least 1 MVA, comprising a laminated stator core which supports a multiphase AC winding and a rotor with a rotor core, surrounded by the stator core, and winding slots running axially along the entire rotor core, each of said winding slots being provided with wall portions facing each other and converging towards an axial central plane and containing a number of winding rods included in a squirrel-cage winding and adapted in shape to the slot walls, the winding rods being sufficiently short-circuited at each rotor end by means of an annular winding portion.

2. The Prior Art

More particularly, the invention relates to a machine construction which is particularly suitable when the current density of the winding and the product of the rotor diameter and the rotor speed is especially great. Based on calculations it can be proved that a ring included in a rotor, for example, a short-circuiting ring in a rotor with a squirrel-cage winding or a retaining ring in a turbo-generator, may be the element which, at high speed, sets an upper limit to the permissible rotor diameter. In a squirrel-cage motor, the starting current, for example, may produce such a great generation of heat in the short-circuiting rings that their strength is reduced, which, in turn, results in deformation and unbalance when the motor reaches full speed if the centrifugal forces are too great.

In two-pole turbo-generators with a speed of about 3000 r.p.m. and a power of more than 1000 MVA, the rotor diameter, because of problems as regards the tensile properties of the retaining rings, must often be chosen smaller than is desirable from other points of view. Calculations concerning a retaining ring show, for example, that its own mass only, with an increasing diameter, causes such a high tangential stress therein that the ability of the ring to take up also centrifugal forces from the coil ends of the rotor becomes zero if the diameter of the rotor exceeds 1500 mm.

SUMMARY OF THE INVENTION

One possible way of avoiding the above-mentioned limitation of the diameter of a turbo-rotor is to use a squirrel-cage asynchronous generator instead of a synchronous generator, but of course only provided that the short-circuiting rings of this generator can be made less sensitive to centrifugal forces than the above-mentioned retaining rings. This can be achieved if an asynchronous machine according to the invention is used.

Using an asynchronous generator instead of a synchronous generator at a power of more than 1000 MVA would, of course, necessitate a large controllable capacitor bank, and also involve considerable complications in other respects. However, it is possible that this may be counterbalanced by advantages in other respects if a machine according to the invention is used as a generator. Besides a suitable length/diameter ratio, an entirely superior rotor construction is obtained in that case with regard to the cost of manufacture and the reliability of service.

According to the invention, the winding slots have wall portions facing each other and converging radially outward with respect to a central plane, and containing a plurality of winding bars fitting the slot walls and forming annular winding portions at each end of the rotor short-circuiting the rotor bars. The annular winding portions lie axially substantially inside the end surfaces of the rotor core and axially outside the end surfaces of the stator core. The bars may be U-shaped in cross-section, with two flanges, one flange of each of two adjacent bars being located in the same winding slot. The end portions of the rotor core have annular grooves therearound.

BRIEF DESCRIPTION OF THE DRAWINGS

In the following, the invention will be described with reference to the accompanying schematic drawings, in which.

DESCRIPTION OF THE PREFERRED EMBODIMENTS

Figure 6:
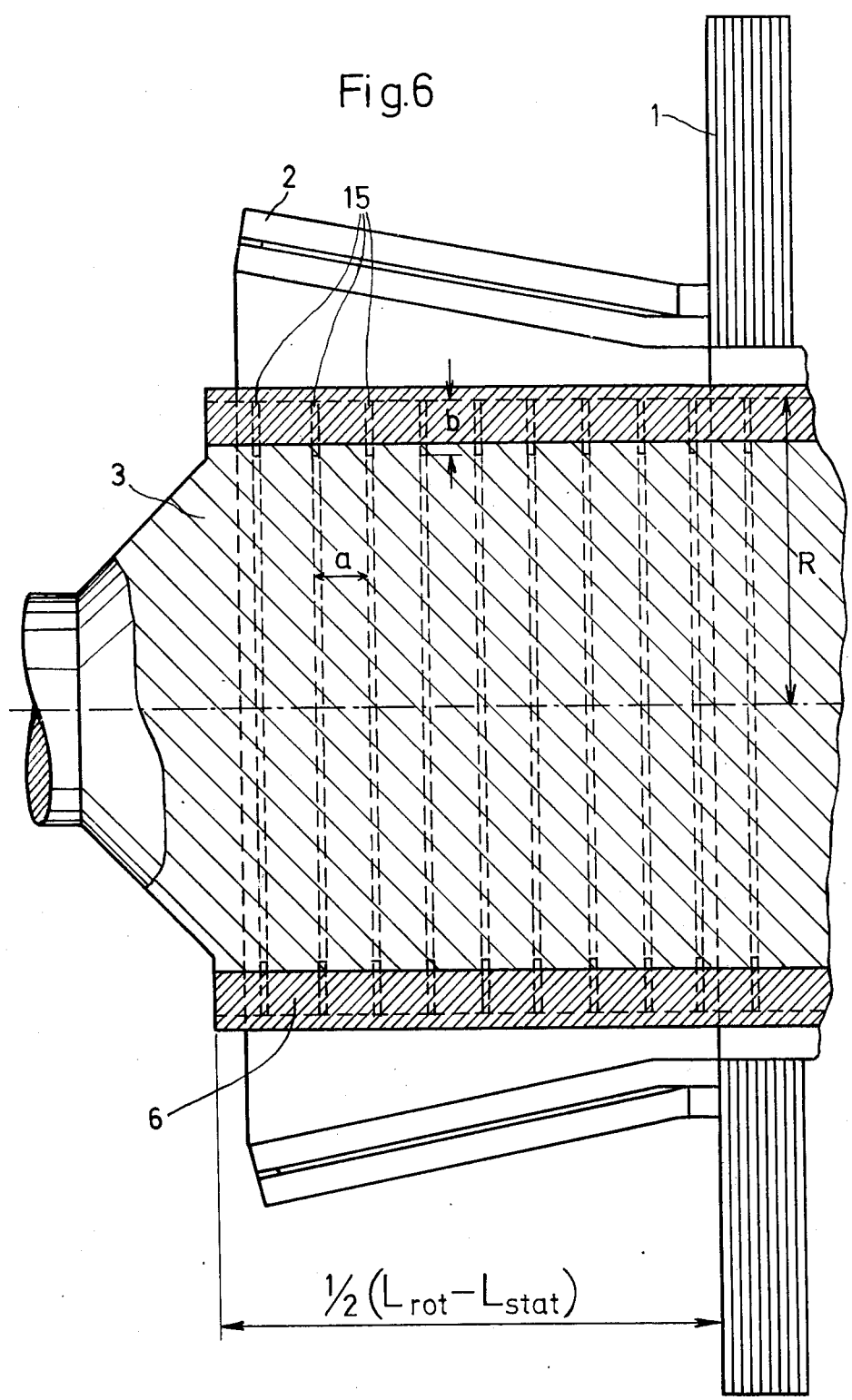
FIG. 6 is a detail of FIG. 1.

In the drawings, 1 designates a laminated stator core of an asynchronous machine according to the invention. The stator core 1 has the axial dimension $L_{stat}$ and supports a multiphase stator winding 2. The stator core 1 surrounds a middle portion of a rotor core 3 which is made of solid steel and provided with winding slots. The active rotor core has the axial dimension $L_{rot}$ which is substantially greater than the length of the stator core. The air gap between the rotor and the stator is represented by the distance indicated by numeral 4, in which part of the copper of the rotor winding is included. The air gap surface of the rotor is designated 10. The rotor winding 5 is constituted as a squirrel-cage winding and consists of a plurality of metal bars 6, which are fixed in the rotor slots between the rotor teeth 7 by forming each rotor slot with radially outwardly converging slot wall portions. Each end of the rotor core is provided with a plurality of annular grooves 15 axially outside a corresponding stator end, each groove lying in a plane which is perpendicular to the axis of rotation, as shown in FIG. 6. Preferably the distance between successive slots is less than twice the depth of the slots. In the embodiment shown in FIG. 2, the metal bars 6 consist of U-shaped bars of copper, each bar having two flanges 9, each lying in an axial plane, and an intermediate web 14 located radially outside a rotor tooth 7, that is, radially outside the air gap surface 10 of the rotor. The web 14 constitutes at least 20% of the cross-section of the profile beam. According to calculations, the difference ½ $L_{rot}$ - ½ $L_{stat}$ always ought to be greater than the radius R of the rotor.

Each of the U-shaped bars arranged in the rotor slots is adapted to make electrical contact with the two nearest slots, at least for the greater part of the distances located axially outside the end surfaces of the stator core. Two U-shaped bars lying immediately adjacent to each other have one flange each in the same winding slot, which is thus completely filled. Over the distance $L_{stat}$, the U-shaped bars 6 act as active rotor conductors, whereas the bar portions located axially outside each end surface of the stator core 1 together form an annular winding part composed of sectors, said winding part providing a fully sufficient short-circuiting of the bar portions operating as active rotor parts. The above-mentioned converging slot wall portions cause the centrifugal force, operating on such a ring sector, to provide an increased contact pressure between two U-shaped bar flanges lying in the same winding slot. With a view to securing a safe contact between the sectors included in the annular winding part, it is also possible to weld these to each other, which should preferably be done by means of electron beam welding.

Figure 3:
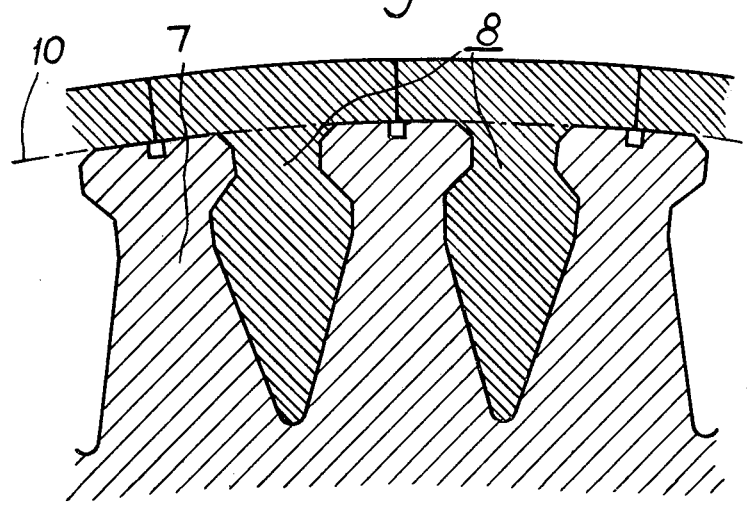

In the embodiment shown in FIG. 3, the axial conductor and short-circuiting part of the squirrel-cage winding are formed of metal bars of good electrical conductivity which are designated 8 and welded together by means of electron beam welding, at least on a predominant part of the winding part located axially outside the stator.

Figure 1:
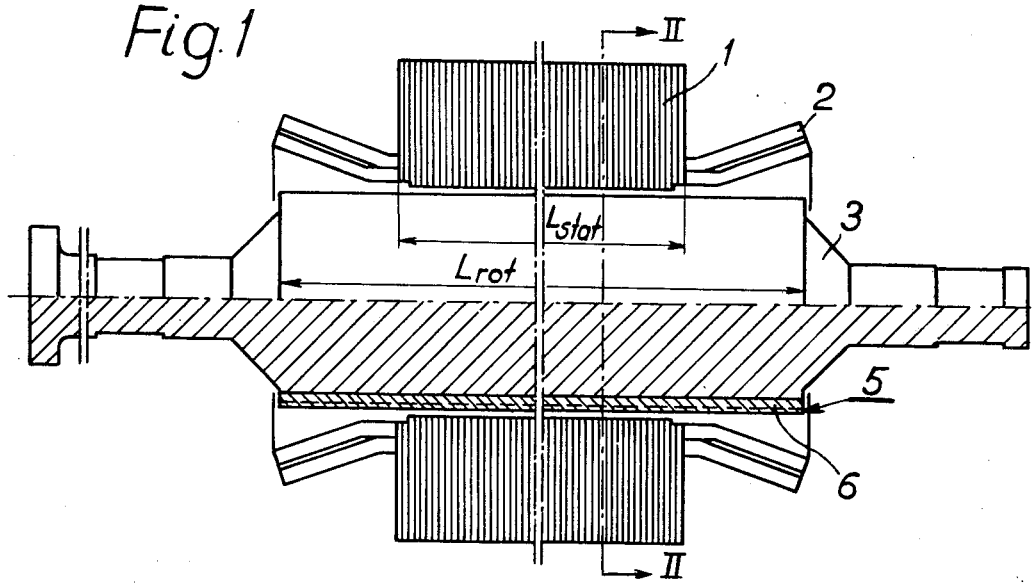
FIG. 1 shows an asynchronous machine according to the invention, preferably intended as a turbo-generator, in axial section.
Figure 4:
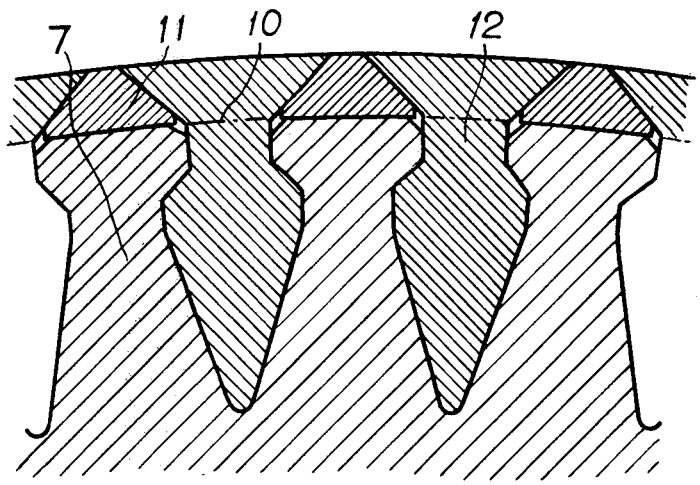
FIGS. 3 and 4 similarly show alternatives to the embodiment shown in FIG. 2.
Figure 5:
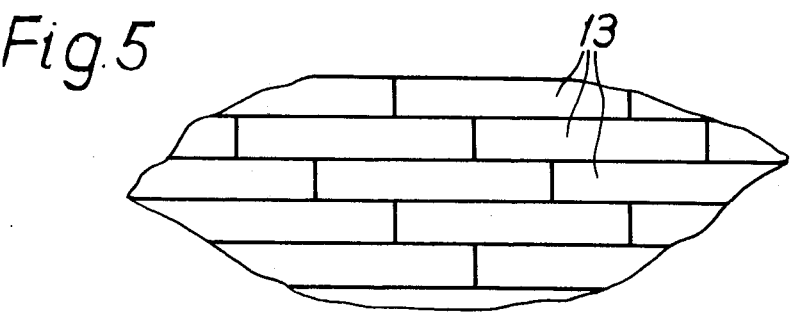
FIG. 5 shows a portion of the rotor surface of a rotor constructed according to FIG. 2 or FIG. 3, seen from the side.

In the embodiment shown in FIG. 4, two different types of conductive metal bars 11 and 12 are used, which extend over the whole rotor length with an unchanged cross-section. It is often necessary to join a plurality of relatively short bar units 13. As shown in FIG. 5, these may suitably be displaced in relation to each other by one third of their lengths. In addition, each bar unit should be welded to the bar units making contact with each other on both sides in the peripheral direction.

Because of certain magnetic fluctuations in the vicinity of the stator teeth, it may often prove necessary to maintain a larger distance between said teeth and the conductors of the rotor than would otherwise be necessary, and therefore the metal bars 6 are preferably made with a smaller radial dimension at the air gap than axially outside the stator core.

Figure 2:
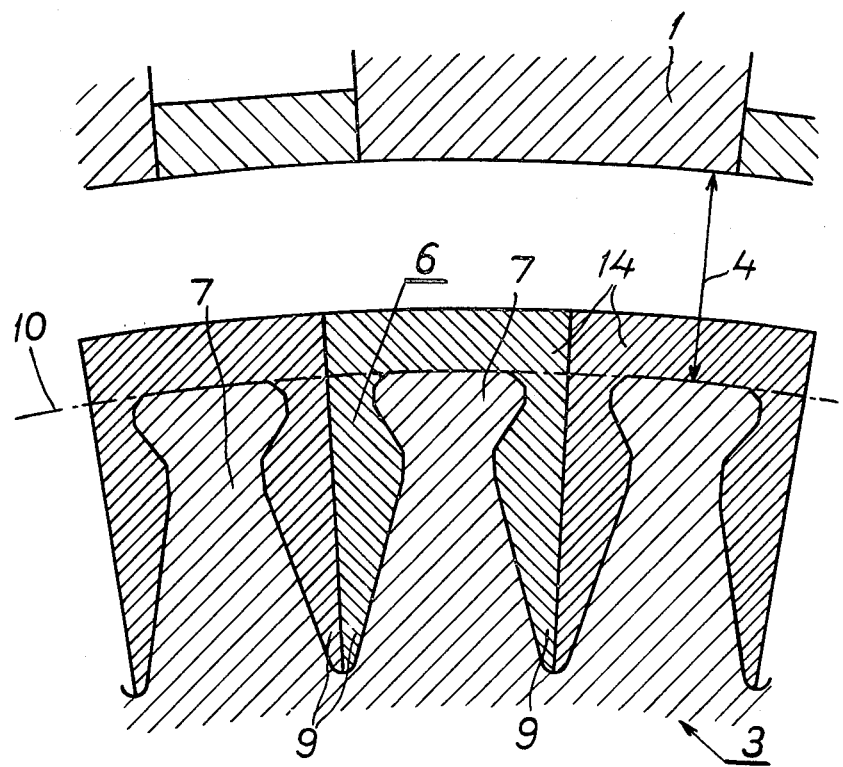
FIG. 2 shows a partial cross-section along the line II—II of FIG. 1.

In the form of FIGS. 2 and 3, each rotor bar is composed of a single segment (6 or 8). In FIG. 2, the radial projections of two adjacent bars fill a slot, while in FIG. 3 a projection of each bar fills a slot, and there are as many segments as there are slots. In FIG. 4, the segments 11 and 12 together form the bars, with the projections of segment 12 filling the slots. In this form, there are twice as many segments as slots.

The current flowing through the annular winding portion gives rise to a magnetic flux which is not linked with the stator winding of the generator and which ought to have as low a value as possible. This is preferably achieved by preventing short flux paths through the rotor iron by means of the grooves 15. Without such grooves, a major part of the magnetic resistance of a flux path may be that belonging to the air radially outside the rotor core, and flux paths having a short air passage might tend to dominate. This could give a very different reactance for different parts of the section of the annular winding portion, and accordingly an uneven current distribution over this section. The grooves thus constitute a means to prevent short flux paths through the rotor iron.

The constructions illustrated on the drawings are particularly suitable for two-pole turbo-generators with a power which is greater than 300 MVA at a speed of about 3000 r.p.m.

I claim:

1. Asynchronous machine with a rated power of at least 1 MVA, comprising a laminated stator core (1) which supports a multiphase AC winding (2) and a rotor (3) surrounded by the stator core and formed with winding slots running axially along the entire rotor core, the length of the active rotor core being substantially greater than the length of the laminated stator core, each of said winding slots being provided with wall portions facing each other and converging radially outwards with respect to an axial central plane, said winding slots containing a plurality of winding bars included in a squirrel-cage winding and fitting the slot walls, an annular winding portion at each end of the rotor short-circuiting the rotor bars, said annular winding portion lying axially substantially inside the end surface of the rotor core and axially outside the end surface of the stator core, the portions of the bars forming said annular winding portion comprising a plurality of segments of material of good electrical conductivity arranged immediately and peripherally after each other, at least some of said segments being formed with radial projections which fill up the winding slots running along said annular winding part, at least 20% of the total cross-section of the segments being located radially outside the air gap surface (10) of the rotor core.

2. Asynchronous machine according to claim 1, in which in that the total number of segments is equal to the total number of winding bars in the rotor core.

3. Asynchronous machine according to claim 1, in which in that the total number of segments is equal to twice the number of winding bars (11, 12).

4. Asynchronous machine according to claim 1, in which segment and winding rod belong to one and the same conductor metal bar (6).

5. Asynchronous machine according to claim 4, in which each bar has a U-shaped cross-section with two flanges, two immediately adjacent metal bars having one flange each in the same winding slot.

6. Asynchronous machine according to claim 5, in which said metal bars are welded to each other at least along the greater part of the winding portion located axially outside the stator core.

7. Asynchronous machine according to claim 6, in which each of a plurality of metal bars is composed of a plurality of conductor units arranged axially one after the other, each conductor unit is axially displaced with respect to an immediately adjacent conductor unit.

* * * * *